United States Patent
Tietze et al.

(10) Patent No.: US 11,243,292 B2
(45) Date of Patent: Feb. 8, 2022

(54) AUTOMATIC CALIBRATION OF A VEHICLE RADAR SENSOR

(71) Applicant: Robert Bosch GmbH, Stuttgart (DE)

(72) Inventors: Nils Tietze, Stuttgart (DE); Alexander Ruppel, Sindelfingen (DE); Stephan Dorenkamp, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 341 days.

(21) Appl. No.: 16/351,714

(22) Filed: Mar. 13, 2019

(65) Prior Publication Data
US 2019/0285729 A1  Sep. 19, 2019

(30) Foreign Application Priority Data

Mar. 15, 2018 (DE) .......................... 102018203941.0

(51) Int. Cl.
*G01S 7/40* (2006.01)
*G01S 7/52* (2006.01)
*G01S 13/931* (2020.01)
*B60W 50/00* (2006.01)

(52) U.S. Cl.
CPC ............. *G01S 7/4026* (2013.01); *G01S 7/40* (2013.01); *B60W 2050/0083* (2013.01); *B60W 2420/52* (2013.01); *G01S 7/403* (2021.05); *G01S 7/52004* (2013.01); *G01S 13/931* (2013.01)

(58) Field of Classification Search
CPC ................ G01S 13/931; G01S 7/4026; G01S 2007/4086; G01S 2013/93271; G01S 7/4021; G01S 7/40; G01S 7/4972; G01S 2013/93275; G01S 7/497; G01S 2007/403; G01S 7/4004; G01S 2013/9327; G01S 7/4091; G01S 7/403; G01S 7/52004; H01Q 1/3233; H01Q 1/125; B60W 2050/0083; B60W 2420/52; G06T 7/80
USPC ................... 342/165, 173, 174, 70; 702/104
See application file for complete search history.

(56) References Cited

U.S. PATENT DOCUMENTS

| | | | | |
|---|---|---|---|---|
| 6,020,844 A * | 2/2000 | Bai | ........................ | G01S 7/4026 342/147 |
| 6,363,619 B1 * | 4/2002 | Schirmer | .............. | G01S 7/4026 33/288 |
| 6,636,172 B1 * | 10/2003 | Prestl | ..................... | G01S 7/4026 342/173 |
| 6,714,156 B1 * | 3/2004 | Ibrahim | ................ | G01S 7/4026 342/174 |
| 11,029,390 B2 * | 6/2021 | Fath | ........................ | G01S 13/931 |
| 11,131,740 B2 * | 9/2021 | Houk | ...................... | G01B 21/24 |

(Continued)

*Primary Examiner* — Olumide Ajibade Akonai
(74) *Attorney, Agent, or Firm* — Norton Rose Fulbright US LLP; Gerard Messina

(57) ABSTRACT

A method for calibrating a radar sensor of a vehicle includes fixing the vehicle in place on a transport; moving the vehicle along a route past a reflector for radar waves using the transport; irradiating the reflector with radar waves and receiving reflected radar waves using the radar sensor while the vehicle is moved along the route; determining a position and/or an alignment of the radar sensor relative to the reflector multiple times based on the reflected radar waves; and spatially calibrating the radar sensor based on the ascertained positions and alignments relative to the reflector by ascertaining a position and/or an alignment of the radar sensor relative to the vehicle.

20 Claims, 4 Drawing Sheets

(56) References Cited

U.S. PATENT DOCUMENTS

| | | | |
|---|---|---|---|
| 2003/0090411 A1* | 5/2003 | Haney | G01S 7/4026 |
| | | | 342/165 |
| 2014/0259707 A1* | 9/2014 | Jones | G01S 7/4026 |
| | | | 33/228 |
| 2014/0347206 A1* | 11/2014 | Steinlechner | G01S 13/931 |
| | | | 342/5 |
| 2015/0070207 A1* | 3/2015 | Millar | G01S 13/4454 |
| | | | 342/174 |
| 2016/0161602 A1* | 6/2016 | Prokhorov | G01S 7/4026 |
| | | | 702/97 |
| 2017/0212215 A1* | 7/2017 | Hellinger | G01S 13/931 |
| 2019/0056479 A1* | 2/2019 | Park | G01S 13/931 |

\* cited by examiner

AUTOMATIC CALIBRATION OF A VEHICLE RADAR SENSOR

CROSS-REFERENCE TO RELATED APPLICATIONS

The present application claims priority under 35 U.S.C. § 119 to DE 10 2018 203 941.0, filed in the Federal Republic of Germany on Mar. 15, 2018, the content of which is hereby incorporated by reference herein in its entirety.

FIELD OF THE INVENTION

The present invention relates to a method and to a system for calibrating a radar sensor of a vehicle.

BACKGROUND

A radar system can be used in vehicles as a base element for sensing the environment. Through the emission of radar waves, i.e., electromagnetic waves, otherwise known as a primary signal, and the reflection of these electromagnetic waves at an object, the reflective component of the radar waves, also known as a secondary signal, is evaluated on the basis of different criteria in order to determine information such as the distance or dimensions of the object.

For use in the vehicle, the radar system should be adjusted or calibrated. This can be accomplished through a manual fine adjustment, or the radar system can have the capability of performing an automatic calibration. The manual calibration is carried out by precisely aligning the radar sensor(s) of the radar system with the geometrical drive axis (e.g., the rear axle) of the vehicle. A laser beam can be used for this purpose, which is projected onto a mirror on the sensor housing and impinges upon a measuring panel in a defined position.

Certain radar systems are able to carry out an automatic calibration during the ride. In the process, the radar system automatically searches for reference points based on which the geometrical drive axis and the installation position are detected and reconciled with one another.

SUMMARY

It is an objective of the present invention to automate and facilitate the calibration of a radar sensor of a vehicle. One aspect of the present invention relates to a method for calibrating a radar sensor of a vehicle. The radar sensor or the radar head can be part of a radar system that is integrated into the vehicle, but it can also be part of an external system, which is mechanically connected to the vehicle from time to time in order to control the vehicle, for instance in an autonomous manner. A vehicle can be an automobile, a road vehicle such as a passenger car, a truck, a bus, a motorcycle, or a commercial vehicle. The method can be used during the automated operation of vehicles such as shuttle vehicles for passenger transportation or transport vehicles in a production facility, in airports, on construction sites, exhibition sites, etc.

According to an example embodiment of the present invention, the method includes fixing the vehicle in place on a transport. The vehicle is able to be fixed in place on the transport by being fastened to the transport and/or by being placed thereon or driven onto it, for instance.

According to an example embodiment of the present invention, the method also includes moving the vehicle, using the transport, along a route past a reflector for radar waves. In general, the reflector can be configured to reflect radar waves. For instance, the reflector can have a flat and/or metallic surface. The route along which the vehicle is guided can be a straight route. This can simplify the calculation of the calibration values (see below).

According to an example embodiment of the present invention, the method also includes irradiating the reflector with radar waves and receiving reflected radar waves using the radar sensor while the vehicle is moved along the route. The radar waves can be generated by the radar sensor and/or be radiated into the environment so that they impinge upon the reflector and are reflected by the reflector to the radar sensor as well.

According to an example embodiment of the present invention, the present method also includes multiple determinations of a position and/or an alignment of the radar sensor relative to the reflector based on the reflected radar waves while the vehicle is transported along the route. Using the reflected radar waves, it is possible to determine a distance of the radar sensor to the reflector and/or a direction relative to the reflector. This makes it possible to detect a relative position and/or an alignment of the radar sensor relative to the reflector. While the vehicle is transported along the route, a plurality of positions and/or alignments of the radar sensor relative to the reflector at different instants or different positions of the vehicle is/are able to be determined in this manner.

According to an example embodiment of the present invention, the method also includes a spatial calibration of the radar sensor based on the ascertained positions and/or alignments relative to the reflector by ascertaining a position and/or an alignment of the radar sensor relative to the vehicle. Based on the relative positions and/or alignments of the radar sensor relative to the reflector at different instants or positions of the transport along the routes, the manner in which the radar sensor is positioned relative to the route is able to be ascertained by geometrical calculations. These geometrical calculations can be particularly simple if the route is a straight route. The position and/or alignment of the radar sensor relative to the vehicle can then be determined from a position of the vehicle relative to the transport. For example, the center axis can be disposed in a centered manner with respect to the transport and/or parallel to the transport route.

According to an example embodiment of the present invention, a lateral displacement of the radar sensor relative to a center axis of the vehicle is ascertained during the spatial calibration of the radar sensor. For example, this can be accomplished by ascertaining the orthogonal distance of the reflector with respect to the transport route of the radar sensor. The difference between the distance of the center axis of the vehicle and the reflector, which can be known from the corresponding fastening of the vehicle to the transport, can then provide the lateral displacement.

According to an example embodiment of the present invention, a deviation of the alignment of the radar sensor relative to a center axis of the vehicle is ascertained during the spatial calibration of the radar sensor. Based on the ascertained alignments of the radar sensor relative to the reflector, it can then be determined in which way the radar sensor is aligned relative to the center axis of the vehicle. An alignment can generally be defined by an angle with respect to a predefined direction such as the transport direction, the direction defined by the transport route, and/or the center axis of the vehicle.

According to an example embodiment of the present invention, the vehicle is fixed in place on the transport in such a way that a center axis of the vehicle points in a predefined direction and/or the center axis has a predefined distance to the reflector. For instance, this can be accomplished by markings on the transport, predefined fastening points, and/or by a predefined affixation of the vehicle to the transport such as using a track, for example.

According to an example embodiment of the present invention, the center axis of the vehicle is aligned relative to the transport using a track. The vehicle is able to be driven into a track, which forces the vehicle to assume a certain position relative to the transport. The track can then guide the vehicle to or onto the transport. For example, the vehicle can be centered on a conveyor belt.

According to an example embodiment of the present invention, the method also includes fastening an external vehicle control system that includes the radar sensor to the vehicle; and autonomously guiding the vehicle to a destination point using the vehicle control system based on measurements by the radar sensor after the radar sensor has been calibrated and the vehicle has left the transport. The external vehicle control system can be mounted on the vehicle, for example, and be electrically connected to a control system of the vehicle. For instance, the vehicle can be equipped with the external vehicle control system at the end of a production line so that it is then autonomously controlled to a loading point of the vehicle.

The method is able to be used for calibrating a system for the autonomous driving of vehicles within a restricted territory, e.g., a factory site.

According to an example embodiment of the present invention, the vehicle control system is fastened to the vehicle while the vehicle is transported by the transport. For example, a technician can fasten the vehicle control system to the vehicle after it has been driven onto the conveyor belt.

According to an example embodiment of the present invention, the transport is a conveyor belt. The vehicle can be driven onto the conveyor band for the fastening. This conveyor belt can then transport the vehicle past the reflector while measurements of the position of the radar sensor relative to the reflector are carried out at the same time.

According to an example embodiment of the present invention, further sensors, which are rigidly connected to the radar sensor, are spatially calibrated based on the spatial calibration of the radar sensor. Using the relative position and/or alignment of the further sensors, corresponding calibration data are able to be generated for these sensors as well. The further sensors can be a GPS sensor, a lidar sensor, a mono-camera, a stereo camera, and/or an ultrasonic sensor.

According to an example embodiment of the present invention, the reflector is a triple reflector. A triple reflector can include areas that have an orthogonal position relative to one another. Similar to a reflector in general, these areas can be developed to reflect radar waves. The areas can have a metallic surface.

A further aspect of the present invention relates to a system for calibrating a radar sensor of a vehicle, the system being configured to carry out the described method. It should be understood that the features of the present method, as described in the previous and in the following text, can also be features of the device, and vice versa.

According to an example embodiment of the present invention, the system includes an evaluation unit for determining a position and/or an alignment of the radar sensor relative to the reflector and for the spatial calibration of the radar sensor. For example, the evaluation unit can be installed in the vehicle or be part of an external vehicle control system.

According to an example embodiment of the present invention, the system includes a transport for transporting the vehicle, e.g., a conveyor belt, a transport track or a transport carriage.

According to an example embodiment of the present invention, the system includes a reflector such as a triple reflector, which is mounted next to the transport.

In the following text, example embodiments of the present invention are described in detail with reference to the appended figures, in which identical or similar parts have been provided with the same reference numerals.

DETAILED DESCRIPTION

Figure 1:
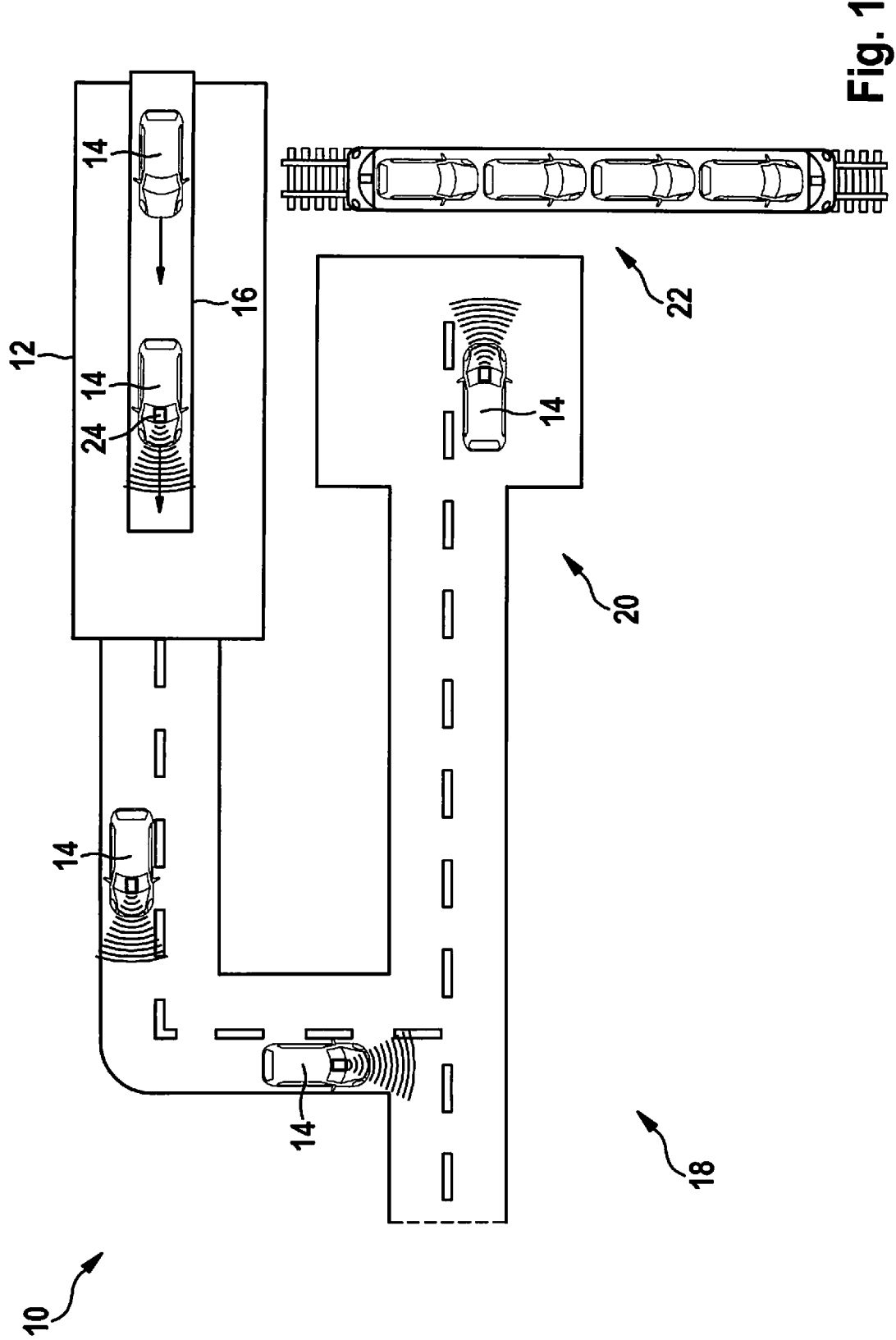
FIG. 1 schematically illustrates a site where a calibration system according to an example embodiment of the present invention can be used.

FIG. 1 schematically shows a factory site 10 where the calibration system and the calibration method can be used. Factory site 10 includes a factory building 12 where vehicles 14 are produced and transported via a conveyor belt or transport 16 to a driving area 18, across which they are driven to a transfer zone 20, where they are loaded in a loading station 22, e.g., onto a truck or train.

For what is known as an end-of-line automation (ELA), newly produced vehicles 14 should already have the capability to drive from the end of conveyor belt 16 inside factory building 12 of the vehicle manufacturer to transfer zone 20 or loading station 22 in a fully automated manner, and thus without a passenger. No sensors that are part of the vehicle are to be used for the automated driving.

In order to enable a vehicle 14 to drive in an automated manner, an external vehicle control system 24, which has sensors of its own, such as a radar sensor, and is connected to an internal vehicle control system of vehicle 14, is therefore mounted on vehicle 14, e.g., while it is still on conveyor belt 16. After vehicle 14 has been equipped with external vehicle control system 24, it can be connected to a fleet management system and is able to receive information therefrom that pertains to a destination point, such as transfer zone 20 or loading station 22.

Since it is possible that external vehicle control system 24 is manually attached to vehicle 14 by a factory worker, it can happen that the installation position of external vehicle control system 24 is not accurately known. For this reason, an adjustment or a calibration of external vehicle control system 24 is carried out as described.

An automated calibration during an operation of vehicle 14 can be disadvantageous in this case because external vehicle control system 24 is meant to be available without restriction already at the end of conveyor belt 16 and a calibration drive is usually not economical. In the same way, a manual calibration can be disadvantageous because vehicle 14 is in the last section of a moving conveyor belt and a stationary adjustment can be time-intensive and thus not economical either.

It should be understood that the calibration system and calibration method are also able to be used for other purposes such as for shuttle vehicles for passenger transport etc., as already mentioned previously.

Figure 2:
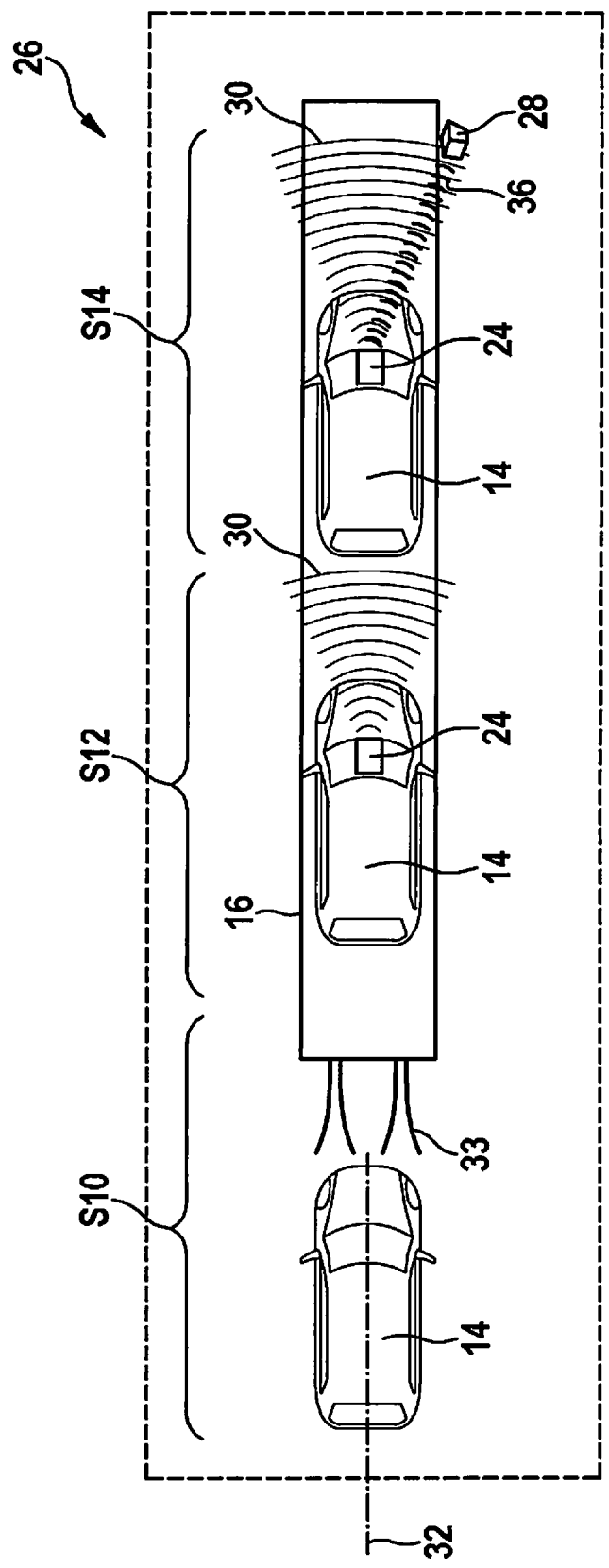
FIG. 2 schematically illustrates a calibration system according to an example embodiment of the present invention.

FIG. 2 schematically shows a calibration system 26, which includes a transport 16 in the form of a conveyor belt, and a reflector 28 for radar waves 30, which is fixed in place next to a transport 16. FIG. 2 also illustrates the calibration method.

In a step S10, vehicle 14 is fixed in place on transport 16 in such a way that a center axis 32 of vehicle 14 points in a predefined direction and/or center axis 32 has a predefined distance to reflector 28. For example, center axis 32 of vehicle 14 can be aligned relative to transport 16 using tracks 33. It should be understood that in the case of a conveyor belt or a transport carriage, vehicle 14 can already be fixed in place thereon simply by placing it on the conveyor belt or the transport carriage.

The selective positioning of vehicle 14 on transport 16 can ensure that a vehicle position on transport 16 is known. The vehicle position can be used for determining the relative position of external vehicle control system 24 and vehicle 14. Profiles that force the tires of vehicle 14 into a certain track and/or profiles such as those used in car wash systems, for example, are able to be used as tracks 33.

In a step S20, for instance when vehicle 14 is already fixed in place on transport 16, a factory worker fastens external vehicle control system 24 to vehicle 14, such as on the windshield.

Figure 3:
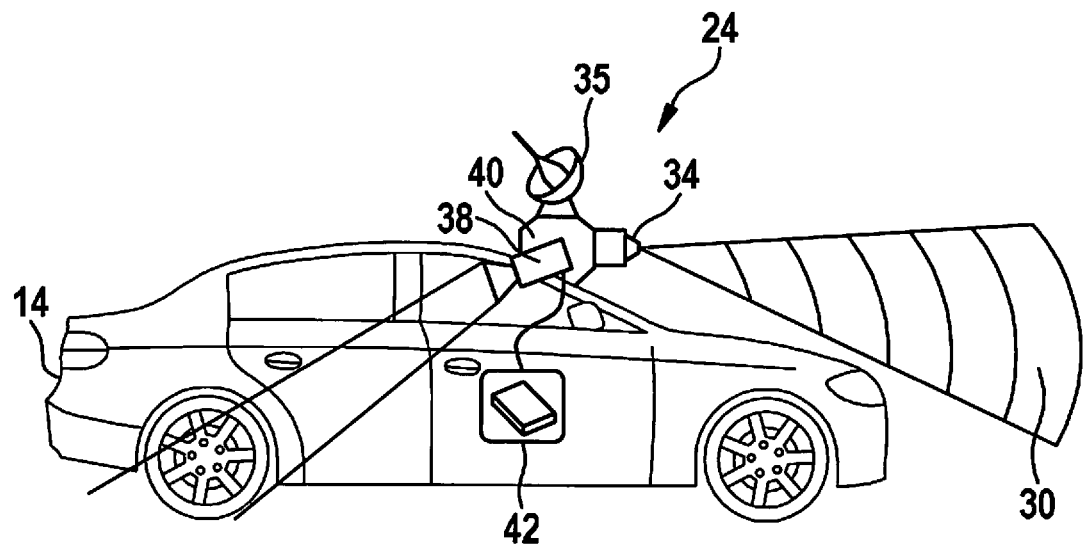
FIG. 3 schematically illustrates an external vehicle control system for a calibration system according to an example embodiment of the present invention.

FIG. 3 schematically shows an external vehicle control system 24, which can be fixed in place on the windshield using suction cups, for example.

Vehicle control system 24 includes a plurality of sensors such as a radar sensor 34, a GPS sensor 35, and a camera 38. As described above, it can also include further sensors such as a lidar, a mono-camera, a stereo camera, and/or an ultrasonic sensor. The sensors are jointly connected to a housing of vehicle control system 24 in which an evaluation unit 40 can be included as well, which is able to carry out the calibration of radar sensor 34 and/or which can be configured to autonomously control vehicle 14 based on the signals from the sensors. Toward this end, external vehicle control system 24 can be connected by a cable to an internal vehicle control system 24 of vehicle 14.

For instance, external vehicle control system 24 can assume GPS tracking, a vehicle control, a communication with the fleet management system, and/or a safety function during the autonomous travel. To ensure safe driving inside factory site 10, road users as well as persons and further objects on the driving surface are to be detected. Radar sensor 34, for instance, can be part of a safety system of external vehicle control system 24, which can assume this task.

Once again with regard to FIG. 2, external vehicle control system 24 is activated at the end of step S12 so that the radar sensor emits electromagnetic waves or radar waves 30 at this instant.

Vehicle 14 is now moved along a route and past reflector 28 by transport 16. Reflector 28 is irradiated by radar waves 30 from radar sensor 34, which leads to reflected radar waves 36, which are able to be detected by radar sensor 34.

Figure 4:
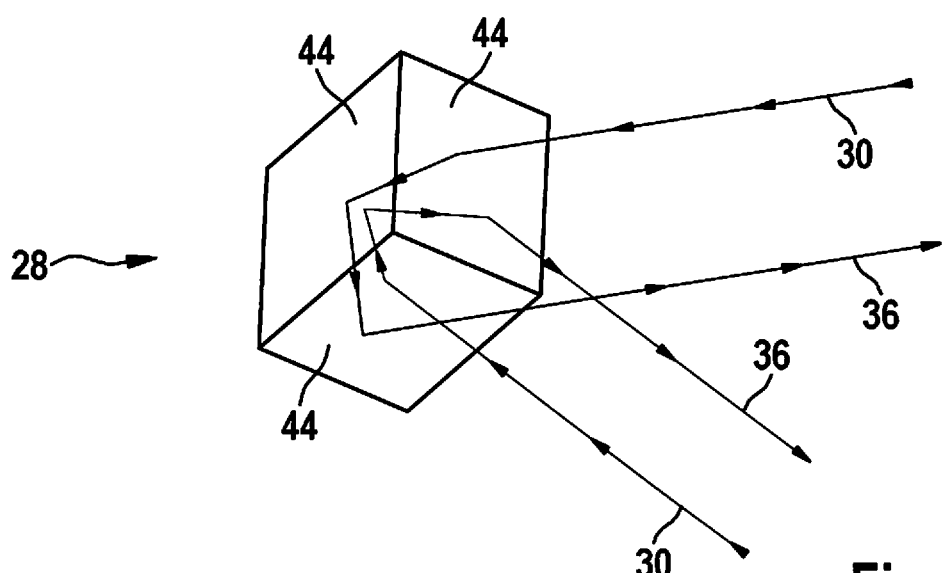
FIG. 4 schematically illustrates a triple reflector for a calibration system according to an example embodiment of the present invention.

FIG. 4 schematically illustrates reflector 28, which is configured as a triple reflector. As shown, triple reflector 28 has three surfaces 44 which are disposed at right angles with respect to one another, with the result that radar waves 30 impinging in one direction are reflected in the same direction after having been deflected twice. Due to the thereby generated strong reflection, external vehicle control system 24 is able to detect triple reflector 28 in an unambiguous manner.

Once again with reference to FIG. 2, in step S14, radar waves 36 reflected by reflector 28 are received using radar sensor 34 while vehicle 14 is moved along the route by transport 16.

In the process, evaluation unit 40 repeatedly determines a position and/or an alignment of radar sensor 34 relative to reflector 28 based on reflected radar waves 36. On the basis of the characteristic of reflected radar waves 36, an unambiguous relative position and also an alignment of radar sensor 34 relative to reflector 28 is able to be calculated.

When enough measurements have been performed and/or at the end of the transport route, evaluation unit 40 carries out a spatial calibration of radar sensor 34. Using the plurality of ascertained positions and alignments relative to reflector 28, evaluation unit 40 calculates a position and/or an alignment of radar sensor 34 relative to vehicle 14.

Since vehicle 14 or external vehicle control system 24 with vehicle 14 moves along using transport 16, a virtually continuous calculation, or a calculation based on numerous measuring points, of the position and orientation of radar sensor 34 is able to be carried out. This can result in a robust estimate.

It is also possible to ascertain a position of the vehicle, e.g., using a velocity of transport 16, for each instant at which a position and an alignment of radar sensor 34 relative to reflector 28 was ascertained. Using the known position of reflector 28 adjacent to transport 16, it is thereby possible to calculate a position and/or an alignment of radar sensor 34 relative to vehicle 14 or to determine an absolute position and alignment of radar sensor 34.

The calibration is also able to be used for additional sensors which are rigidly connected to radar sensor 34, such as sensors 35, 38. For example, this can be done when a rigid connection and known distances and/or orientations exist between radar sensor 34 and the further sensors.

Figure 5:
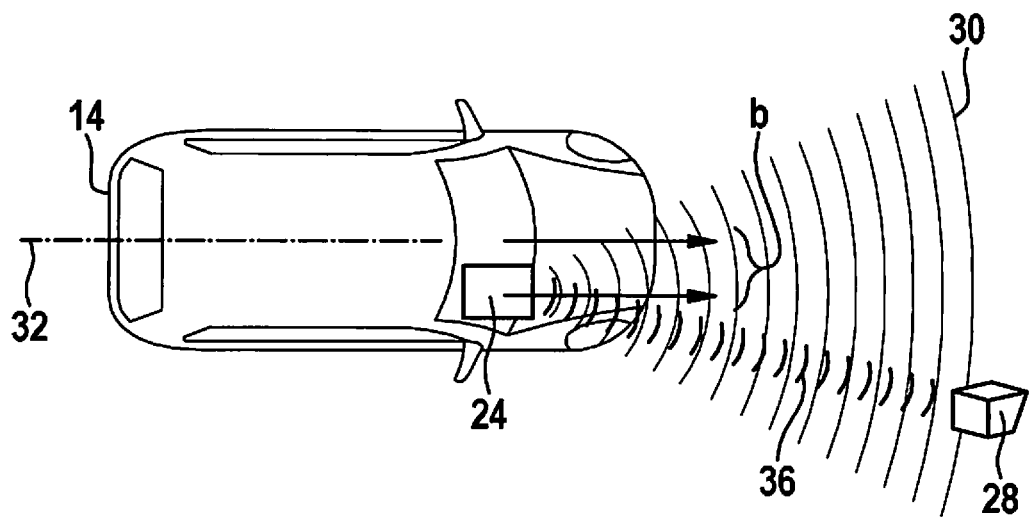
FIG. 5 illustrates how a lateral displacement of the radar sensor is able to be determined using a calibration method according to an example embodiment of the present invention.
Figure 6:
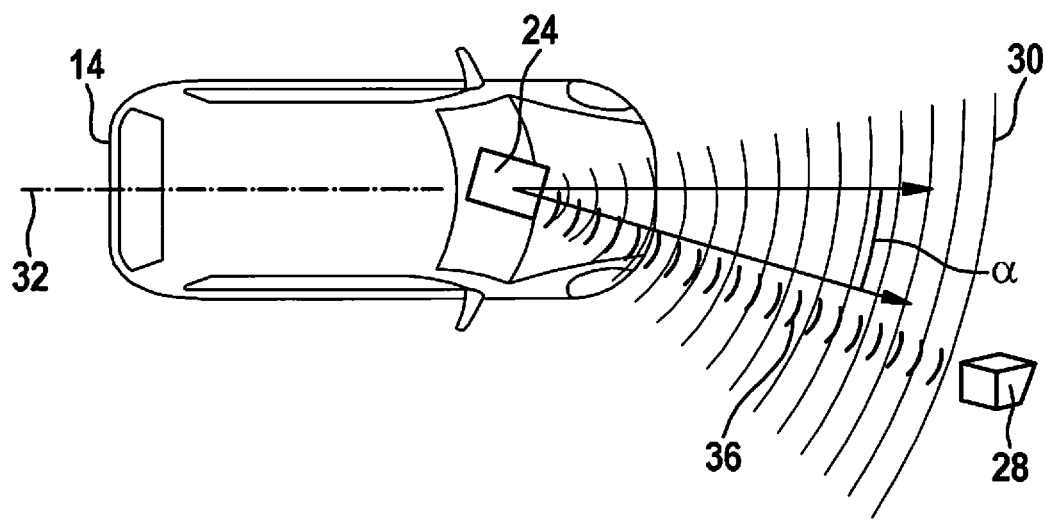
FIG. 6 illustrates how an alignment of the radar sensor is able to be determined using a calibration method according to an example embodiment of the present invention.

As illustrated in FIGS. 5 and 6, essentially two errors can be caused in step S12 in which external vehicle control system 24 is attached to vehicle 14 by a factory worker. As shown in FIG. 5, the system can be mounted at a lateral offset. As illustrated in FIG. 6, an error can also occur during the alignment of external vehicle control system 24.

The described method is able to be used to compensate for both mounting errors. For example, the position of center axis 32 of the vehicle can be known as a result of the centering described in step S10. It is therefore possible to calculate deviation b. In this case, a lateral offset b of radar sensor 34 relative to a center axis 32 of vehicle 14 is able to be ascertained during the spatial calibration of radar sensor 34.

Alignment error $\alpha$, i.e., the angle between the line of vision of radar sensor 34 and center axis 32, is able to be determined on the basis of the direction of the reflection, i.e., the reflected radar waves 36. In this case, a deviation in the alignment of radar sensor 34 relative to a center axis 32 of vehicle 14 is able to be ascertained during the spatial calibration of radar sensor 34.

The present method makes it possible to provide a rapid operation capability of the external vehicle control system. In addition, on account of the automated calibration, different installation positions are possible for the external vehicle control system, which results in an increase in the availability of the external control system and makes for an easier installation of the external vehicle control system by a factory worker. The continual calculation of the radar position at different positions of vehicle 14 transported by transport 16 allows for a precise determination of the radar sensor position, which also makes it possible to achieve a higher quality than during the manual calibration, for instance.

Finally, external vehicle control system 24 can autonomously guide vehicle 14 to a destination, e.g., transfer zone 20 or loading station 22. This can be accomplished on the basis of measurements by radar sensor 34 after radar sensor 34 has been calibrated and vehicle 14 has left transport 16.

In summary, a method for calibrating a radar sensor 34 and/or an external vehicle control system 24 of a vehicle 14 is described, which is fixed in place on the transport or is placed on a movable surface. Using a triple reflector 28, the position and/or alignment of radar sensor 34 is able to be determined on the basis of reflected radar waves 36 of radar sensor 34 and using an algorithm which is implemented in external vehicle control system 24. The present invention allows for a fully automated calibration of radar sensor 34 and can make a complicated manual adjustment or calibration obsolete.

In addition, it is noted that "including" does not exclude other elements or steps and "a" does not exclude a plurality. Furthermore, features or steps that have been described with reference to one of the above example embodiments can also be used in combination with other features or steps of other afore-described example embodiments.

What is claimed is:

1. A method for calibrating a radar sensor of a vehicle, the method comprising:
   fixing the vehicle in place on a transport;
   using the transport to move the vehicle along a route past a radar wave reflector;
   while the vehicle is moved along the route:
      the radar sensor irradiating the reflector with radar waves; and
      receiving reflected radar waves, reflected by the reflector as reflections of the radar waves with which the reflector had been irradiated;
   ascertaining one or both of a position and an alignment of the radar sensor relative to the reflector multiple times based on the received reflected radar waves;
   spatially calibrating the radar sensor based on the ascertained one or both of the position and alignment by ascertaining one or both of a position and an alignment of the radar sensor relative to the vehicle;
   wherein the method includes at least one of the following two features (1)-(2):
      (1) the spatially calibrating at least one of:
         (a) includes ascertaining a lateral positional offset of a lateral position of the radar sensor as a whole from a center axis of the vehicle and determining a lateral position alignment correction value based on the ascertained lateral offset; and
         (b) is performed using a value of a velocity of movement of the transport; and
      (2) the reflector at least one of:
         (a) has three reflecting surfaces arranged at right angles to one another; and
         (b) is structured to receive the radar waves from the radar sensor, subsequently deflect the radar waves twice, and subsequently output the radar waves as the reflected radar waves.

2. The method of claim 1, wherein an angular deviation of the alignment of the radar sensor relative to a center axis of the vehicle is ascertained during the spatial calibration of the radar sensor.

3. The method of claim 1, wherein the vehicle is fixed in place on the transport such that at least one of (a) a center axis of the vehicle points in a predefined direction and (b) the center axis has a predefined distance to the reflector.

4. The method of claim 1, further comprising aligning a center axis of the vehicle relative to the transport using a track.

5. The method of claim 1, further comprising:
   mounting on the vehicle an external vehicle control system that includes the radar sensor; and
   autonomously guiding the vehicle to a destination using the external vehicle control system based on measurements by the radar sensor after the radar sensor has been calibrated and the vehicle has left the transport.

6. The method of claim 5, wherein the vehicle control system is mounted onto the vehicle while the vehicle is transported by transport.

7. The method of claim 1, wherein the transport is a conveyor belt.

8. The method of claim 1, wherein the reflector is a triple reflector.

9. The method of claim 1, wherein the spatially calibrating includes the ascertaining the lateral positional offset of the lateral position of the radar sensor as a whole from the center axis of the vehicle and the determining the lateral position alignment correction value based on the ascertained lateral offset.

10. The method of claim 9, wherein the spatially calibrating includes additionally ascertaining an angular deviation of the alignment of the radar sensor relative to the center axis of the vehicle.

11. The method of claim 1, wherein the spatially calibrating is performed using the value of the velocity of movement of the transport.

12. The method of claim 1, wherein the reflector has the three reflecting surfaces arranged at the right angles to one another.

13. The method of claim 1, wherein the reflector is structured to receive the radar waves from the radar sensor, subsequently deflect the radar waves twice, and subsequently output the radar waves as the reflected radar waves.

14. The method of claim 1, further comprising spatially calibrating one or more additional sensors other than the radar sensor based on (a) a rigid connection of the one or more additional sensors to the radar sensor and (b) the spatial calibration of the radar sensor.

15. A system for calibrating a radar sensor of a vehicle, the system comprising:
   a processor configured to perform a method, the method including:
      determining one or both of a position and an alignment of the radar sensor relative to a reflector multiple times based on reflected radar waves reflected by the reflector as reflections of radar waves with which the radar sensor irradiates the reflector while the vehicle is moved by a transport along a route past the reflector; and spatially calibrating the radar sensor based on the ascertained one or both of the position and alignment by ascertaining one or both of a position and an alignment of the radar sensor relative to the vehicle;
wherein the method, which the processor of the system is configured to perform, includes at least one of the following two features (1)-(2):
(1) the spatially calibrating at least one of:
 (a) includes ascertaining a lateral positional offset of a lateral position of the radar sensor as a whole from a center axis of the vehicle and determining a lateral position alignment correction value based on the ascertained lateral offset; and
 (b) is performed using a value of a velocity of movement of the transport; and
(2) the reflector at least one of:
 (a) has three reflecting surfaces arranged at right angles to one another; and
 (b) is structured to receive the radar waves from the radar sensor, subsequently deflect the radar waves twice, and subsequently output the radar waves as the reflected radar waves.

16. The system of claim 15, wherein the spatially calibrating includes the ascertaining the lateral positional offset of the lateral position of the radar sensor as a whole from the center axis of the vehicle and the determining the lateral position alignment correction value based on the ascertained lateral offset.

17. The system of claim 16, wherein the spatially calibrating includes additionally ascertaining an angular deviation of the alignment of the radar sensor relative to the center axis of the vehicle.

18. The system of claim 15, wherein the spatially calibrating is performed using the value of the velocity of movement of the transport.

19. The system of claim 15, wherein the reflector has the three reflecting surfaces arranged at the right angles to one another.

20. The system of claim 15, wherein the reflector is structured to receive the radar waves from the radar sensor, subsequently deflect the radar waves twice, and subsequently output the radar waves as the reflected radar waves.

* * * * *